United States Patent
Menke et al.

(10) Patent No.: US 8,180,482 B2
(45) Date of Patent: *May 15, 2012

(54) METHOD FOR PRODUCING A ROTATIONALLY SYMMETRIC LENS FROM A CERAMIC GREEN BODY AND MOULDING TOOL FOR PERFORMING THE METHOD

(75) Inventors: Yvonne Menke, Mainz (DE); Ulrich Peuchert, Bodenheim (DE); Yoshio Okano, Mainz (DE); Steffen Reichel, Mehlingen (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,567

(22) Filed: Jun. 7, 2011

(65) Prior Publication Data

US 2011/0254180 A1 Oct. 20, 2011

Related U.S. Application Data

(62) Division of application No. 11/968,712, filed on Jan. 3, 2008, now Pat. No. 8,019,461.

(30) Foreign Application Priority Data

Jan. 9, 2007 (DE) .......................... 10 2007 002 078

(51) Int. Cl.
 *G06F 19/00* (2011.01)
 *G06F 7/60* (2006.01)
(52) U.S. Cl. ............. 700/204; 700/206; 703/2; 425/808
(58) Field of Classification Search .................. 700/197, 700/204, 206; 703/2; 425/808; 264/1.32
 See application file for complete search history.

(56) References Cited

U.S. PATENT DOCUMENTS

| | | | |
|---|---|---|---|
| 7,251,538 B2 | 7/2007 | Ueno et al. | |
| 7,546,175 B2 | 6/2009 | Ueno et al. | |
| 7,584,015 B2 * | 9/2009 | Ueno et al. | 700/204 |
| 7,605,103 B2 | 10/2009 | Kintaka | |
| 8,019,461 B2 * | 9/2011 | Menke et al. | 700/204 |
| 2002/0099112 A1 | 7/2002 | Turner et al. | |
| 2003/0018408 A1 | 1/2003 | Sagae et al. | |
| 2007/0043463 A1 | 2/2007 | Ueno et al. | |

FOREIGN PATENT DOCUMENTS

| | | |
|---|---|---|
| EP | 1 460 050 | 9/2004 |
| EP | 1 810 955 | 7/2007 |
| WO | 2005/118246 | 12/2005 |
| WO | 2006/051668 | 5/2006 |

* cited by examiner

*Primary Examiner* — Sean Shechtman
(74) *Attorney, Agent, or Firm* — Michael J. Striker

(57) ABSTRACT

The method for producing at least one rotationally symmetrical lens consisting of an opto-ceramic includes the step of moulding a ceramic green body for the lens, wherein the mould has a shaping surface, which is described by the following equation B:

$$y1 = \frac{cz^2}{1 + \sqrt{1 - (k+1)c^2 z^2}} + a_1 z^2 + a_2 z^4 + a_3 z^6 + a_4 z^8 + \ldots, \quad (B)$$

y1 gives a position on an optical axis; x designates a perpendicular distance from the optical axis to the surface; k, c, and $a_1, a_2, a_3, a_4, \ldots$ are constants describing a surface of the lens to be moulded and $z=|x|+b$, wherein b is a constant with a value greater than 0 and less than 0.3 mm, which is a measure of a deviation of the shaping surface from the surface of the lens.

20 Claims, 14 Drawing Sheets

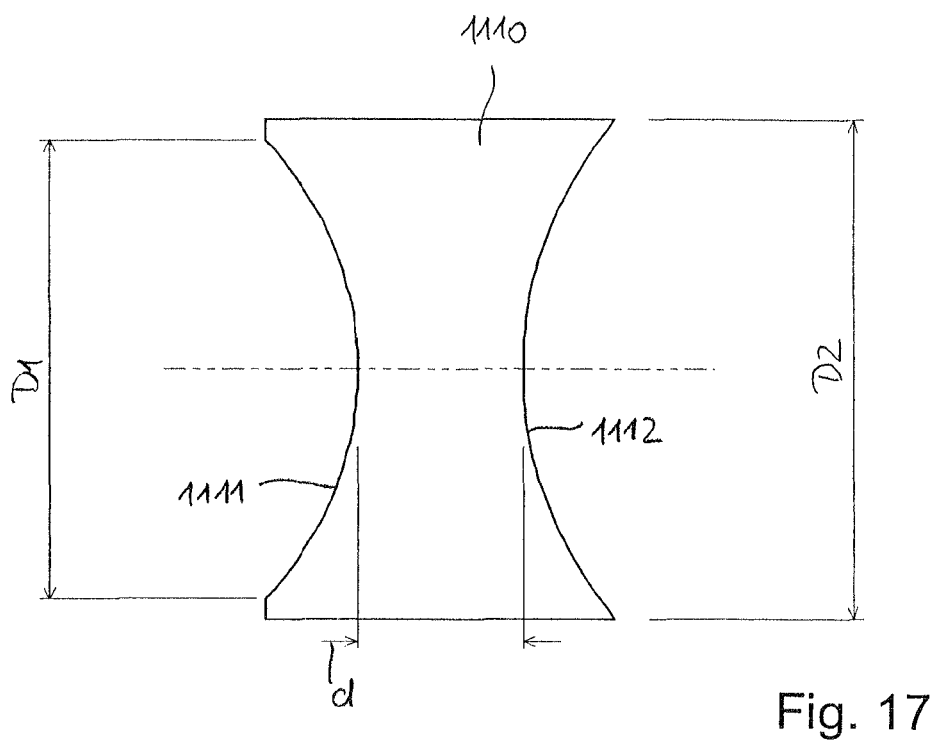
Fig. 17
Fig. 18
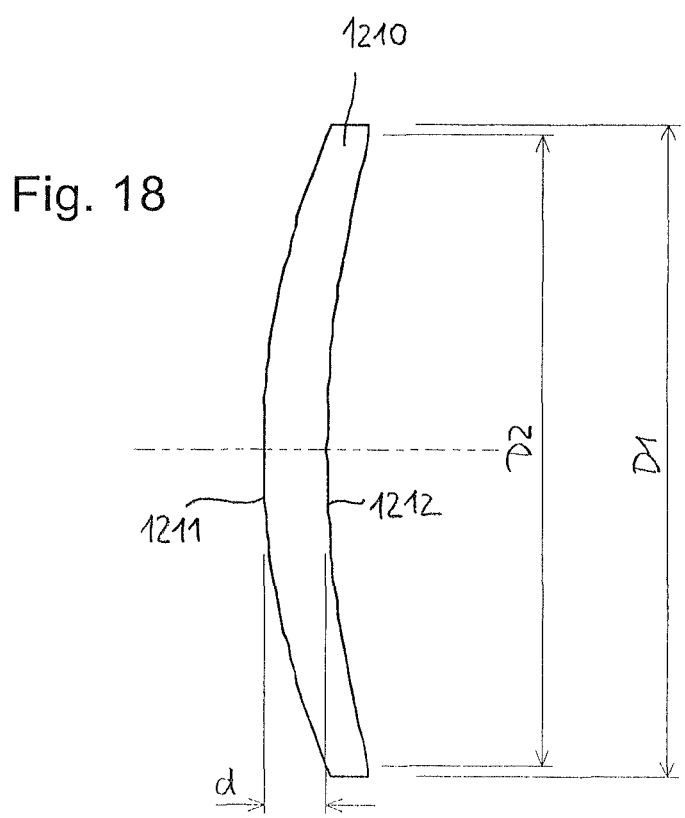

METHOD FOR PRODUCING A ROTATIONALLY SYMMETRIC LENS FROM A CERAMIC GREEN BODY AND MOULDING TOOL FOR PERFORMING THE METHOD

CROSS-REFERENCE

This is a divisional of U.S. patent application Ser. No. 11/968,712, filed on Jan. 3, 2008, from which U.S. Pat. No. 8,019,461 is issued on Sep. 13, 2011.

BACKGROUND OF THE INVENTION

1. The Field of the Invention

The present invention relates to a moulding tool for moulding a ceramic green body in the production of at least one optical lens made of an opto-ceramic. The invention includes a method of producing the at least one lens from the ceramic green body using the moulding tool of the invention. Also, the invention is directed to the use of a moulding tool for producing opto-ceramic lenses.

2. Description of the Related Art

Transparent ceramics suited as materials for lenses are hereinafter referred to as opto-ceramics. Such materials have very convenient properties (refractive indices, dispersions) and contribute to an improvement of optical imaging systems. In special cases new imaging concepts are only possible with such new optical material options. Especially the possibilities of more compact construction of for example digital cameras or improved or simplified colour corrections (chromatical or apochromatical) or mentioned here.

The lenses that can be produced with the moulding tool according to the invention and by making use of the new and advantageous process claimed herein consist of opto-ceramics. Such materials are defined afterwards. The term "consist of" in the sense of this invention does not exclude the presence of remaining binders or other additives present in the final lens besides the single phase, poly crystalline material (see below). Such compounds may be present depending on what concise process was used for producing the respective lens.

An opto-ceramic is substantially a single phase, poly crystalline material based on oxides and having high transparency. Opto-ceramics are hence a subdivision of ceramics. Lenses made of opto-ceramics are therefore in certain applications preferred over conventional lenses made of glass. A prerequisite for the successful placement on the market is the supply of sufficient amounts of high quality lenses with good reproducibility at acceptable prices. The prices are geared to the prices of conventional lenses of glass.

A further aspect in providing cost-effective lenses from opto-ceramics is that these lenses should not only comprise a refractive function but also function reflectively, transmittively and diffractively.

Additionally, mechanical properties like for example supporting areas, adjoining the lens circularly on the sides and thereby allowing positioning of the lens in the carrier, are often needed next to the optical functions. Even more complex mould recesses that are placed onto a local part of the lens might be needed in order to make integration into an optical system possible (monolithic optical elements).

Today lenses made from opto-ceramics are usually produced as follows. First the powders of the basic material (mostly oxides) are produced (first step: powder production). The powders used are often of high purity and in the nanometer scale as far as their sizes are concerned. Then the powders are conditioned (second step: powder conditioning). This step comprises milling of the powders, homogenizing the powder mixture and drying the batch. This step is followed by the third step which is the moulding step, where a green body is formed, already determining the final shape of the lens, and if necessary certain additives are added that depend on the moulding method to be applied. Afterwards the green body is—if necessary—dried and/or debindered (if necessary: fourth step: drying and/or debindering). In the fifth step, sintering, the grains that are in loose contact to each other after moulding and—if necessary—drying and/or debindering form fixed contacts by mass transfer and/or diffusion. Simultaneously an increase in grain size is achieved and open porosity is removed from the body. In the subsequent sixth step of hot isostatic pressing (HIP) the closed porosity within the grain boundaries is pressed out of the sintered body. The thus obtained body can if necessary be further processed in a further step (seventh step: thermic post-processing), a post-processing step in form of further annealing steps and/or profiles, in order to remove the oxygen vacancies or graphite impurities produced by the HIP process or reduce the intergranulary fine porosity.

Preferably lenses from the following opto-ceramics are produced by using the above-mentioned production process:

a) cubic garnets of the generic stoichiometry $$(1-m)\{(M1)_{3+z3}(M2)_{5-z3}O_{12}\}m\{A\}$$

wherein z3 has a value in the range of from −1 to +1, m has a value of from near zero to less than 0.05, preferably less than 0.03 and further preferred near zero or equal to zero.

M1 is selected from Y, La, Gd, Lu, Yb, Ce, Pr, Nd, Pm, Sm, Eu, Tb, Dy, Ho, Er, Tm or a mixture of one or more of these elements, wherein the active lanthanides Ce, Pr, Nd, Pm, Sm, Eu, Tb, Dy, Ho, Er, and Tm are either present within the opto-ceramic in amounts of together up to 100 wt-ppm or at least 15 mol % relating to the amount of these oxides;

M2 is selected from one or more of the elements of the group III or IIIa of the periodic table of elements, preferably from Al, Ga, In, Sc or a mixture of two or more of these elements;

A is one or more of additional components, especially selected from $SiO_2$, $Na_2O$, MgO, CaO or $TiO_2$.

b) zirconium oxide, preferably cubically stabilized zirconia, of the generic formula $$(1-m)\{z1[ZrO_2]z2[HfO_2](1-z1-z2)[X_2O_3]\}m[A] \text{ or}$$

$$(1-m)\{z1[ZrO_2]z2[HfO_2](1-z1-z2)[MO]\}m[A]$$

wherein z1+z2 is less than or equal to 0.92 and preferably smaller or equal to 0.90, wherein z1 and z2 are more than or equal to zero, m is less than 0.10 and preferably less than 0.06, further preferred less than 0.03 and most preferred m is zero;

X is selected from Y, Sc, La, Ce, Pr, Nd, Pm, Sm, Eu, Gd, Tb, Dy, Ho, Er, Tm, Yb, Lu or a mixture of one or more of these elements, preferably selected from Y, Yb and Lu or a mixture of two or all three of these elements and particularly preferred X is Y, M is selected from Ca and Mg; and A is one or more components, especially selected from $SiO_2$, NaO, MgO, CaO, or $TiO_2$.

c) cubic sesquioxides like $Y_2O_3$, $Lu_2O_3$, $Yb_2O_3$, $In_2O_3$, $Sc_2O_3$ and/or isotype cubic mixed crystal phases of the above oxides with other oxides like $Gd_2O_3$, $La_2O_3$, $ZrO_2$, $HfO_2$ etc.

d) Mg—Al-spinels of the approximate formula $MgAl_2O_4$ and e) Al-Oxinitrides of the generic formula $$Al_{23-1/3x}O_{27+x}N_{5-x}, \text{ wherein } 0.429<X<2, \text{ for example } Al_{23}O_{27}N_5$$

f) Perovskites

It can be taken from the above explanation of the production process for lenses made from opto-ceramics that the third step of moulding is decisive for the final form of the lens, because the shape obtained within this process step is not changed considerably during subsequent process steps. The subsequent steps merely cause contraction and shrinkage of the green body obtained by the moulding step.

Furthermore, the moulding method used and, hence, also the applied mould decisively determine the later properties of the opto-ceramic as far as optical properties are concerned, as the moulding step decisively influences the conduct of subsequent sintering and/or drying/debindering.

As moulding method different methods are used that differ mainly by their moisture content. Casting (25-40% moisture) comprises the methods of slip casting, vacuum pressure casting, pressure slip casting or electrophoresis as well as centrifugal slip casting.

The term plastic moulding (15-25% moisture) means the methods of extrusion, squeezing, turning and free forming.

The methods of wet pressing, dry pressing, pounding and compacting by vibration belong to the pressing techniques (0-15% moisture). As further methods that are not classified according to the moisture content of the moulded material the moulding methods of hot casting (also referred to as low pressure die casting) or die casting can be used.

It is known from the prior art that lenses made of transparent ceramics can be obtained by moulding by pressing. For example, DE 101 95 586 T1 describes the production of special opto-ceramics with perovskite structure. Therein (see from page 15) "... the ceramic powder material is processed with a binder to a predetermined shape such that a ceramic green compact is obtained . . . ". In a subsequent burning step the green compact is preferably embedded in specific powder. The processing of the ceramic powder material to a predetermined geometry is done using a binder. According to exemplary embodiment 7 moulding is done especially by pressing at 2000 kg/cm2 (196 MPa) in order to obtain a pane-shaped green compact with a diameter of 30 mm and a thickness of 1.8 mm.

EP 1 701 179 A1 discloses the use of cubic garnets for optical elements in microlithography in wavelength region <200 nm. Particularly, this document discloses the production of mono-crystals. Moulding tools or processes are not mentioned.

Further US 2004/0159984 A1 describes the production of transparent $Y_2O_3$ ceramics by moulding methods like slip casting or die casting. The document mentions the production of complex geometries, however, without specifying the shape of the moulding tool in detail. Especially, the production of components with curved surfaces is not mentioned.

The process of slip casting for the production of transparent ceramics for laser applications based on pane-shaped specimen is described by Ueda ('Scalable Ceramic Lasers for IFE Driver'. Institute for Laser Science, Univ. of Electro-Communications, Japan-US Workshop ILE/Osaka, Mar. 13, 2003).

The processes described in the prior art are not suited for the cost-effective production of transparent ceramic lenses having superior optical qualities mad. In order to achieve the desired optical effects, lenses comprise definitely curved surfaces.

According to "Optical System Design" by Robert E. Fischer, ISBN 0071314916-2 the mathematical description of lens surfaces is achieved by the following equation:

$$y = \frac{cx^2}{1 + \sqrt{1 - (k+1)c^2x^2}} + a_1 x^2 + a_2 x^4 + a_3 x^6 + a_4 x^8 + \ldots , \quad (A)$$

wherein y is the location on the optical axis, k is the conic constant, x is the perpendicular distance from the optical axis, c=1/R and R is the radius of the curve and a1, a2, a3, a4, . . . are the coefficients of the aspheric term.

Spherical lenses are distinguished from aspherical lenses as follows:
k=0 and a1, a2, a3 . . . =0 spherical lens
k≠0 aspherical lens,
wherein the curves can be distinguished as follows:
k<−1 hyperboloid surface
k=−1 paraboloidal surface
−1<k<0 ellipsoid surface
k>0 flattened spherical These lens surfaces are according to the prior art obtained by extensive chemical milling, grinding and polishing processes from a bulk semi-finished part. The processing of these simply shaped bulk semi-finished parts is time consuming and cost-intensive. This is especially true, because many opto-ceramic systems, like for example the group of sesquioxides ($Y_2O_3$, $Yb_2O_3$, $Sc_2O_3$, $Lu_2O_3$) and/or mixed crystals of these, garnets (for example YAG Yttrium-Aluminium-Garnet), AlON (Aluminium Oxinitride), $Al_2O_3$, perovskites, spinels, cubically stabilised zirconium oxide or hafnium oxide, are very hard materials. Especially the chemical milling and grinding processes for the production of shapes with recesses are thus very cost-intensive.

SUMMARY OF THE INVENTION

It is hence desirable to significantly simplify the process and to reduce and possibly even avoid grinding, i.e. reduce post-processing while fulfilling highest standards as to precision. This will save costs. Also it is an aim to increase the efficiency of the process in terms of producing more than one lens at the same time.

It is therefore the object of the present invention to provide a moulding tool that allows for a cost effective and efficient production of opto-ceramic lenses showing the desired above-mentioned geometries. The moulding tool must be suited to precisely produce opto-ceramic lenses, the latter must fulfill highest standards as to precision. It is a further object of the present invention to provide for a corresponding use of such a moulding tool and still further to provide a process for producing the opto-ceramic lenses.

The problems (objects) are solved by the subject-matter as set out in the claims.

The invention refers to a moulding tool comprising a near-net-shape negative mould. This mould corresponds to the later functional area (or surface) of the lens and is described based on the above shown equation A. This equation is modified in such a manner that the difference between the form of the mould and the respective form of the lens to be made is considered, resulting in the below equation B:

(Equation B)

$$y1 = \frac{cz^2}{1 + \sqrt{1 - (k+1)c^2 z^2}} + a_1 z^2 + a_2 z^4 + a_3 z^6 + a_4 z^8 + \ldots , \quad (B)$$

wherein b is a constant above zero with preferred values being smaller than 0.3 mm, smaller than 0.1 mm, and most preferred smaller than 0.05 mm; b describes the deviation of the negative mould of the moulding tool describing the deviation of the negative mould of the moulding tool and the respectively resulting functional area of the final lens.

The functional area of the final lens may herein also be defined as "at least one area to be moulded". This can either be one area, if only one functional area is moulded. The resulting lens shows consequently at least one functional area, however, it may be possible that a second functional area can be obtained by techniques different from moulding, as for example grinding. Preferably the moulding tools as defined herein are suited to produce lenses having more than one functional area.

The present invention is based on the finding that the use of a near-net-shape negative mould already within the moulding step of moulding the green body of the optical element (lens), leads to considerable advantages. It is hence possible to obtain a green body with a form that is very close to the final form of opto-ceramic lens. This allows for significantly reduced post-processing expenditure. In particular, cost intensive chemical milling, grinding and polishing can be reduced or even avoided.

Herein near-net-shape moulding means in context with the present invention that the geometry of the produced green compact (green body with green form) is very close to the end form of the sintered body. The body obtained after running through process steps 1 to 7 (ceramication route) shows the hereinafter called raw form. The body being post-processed by grinding, polishing, lapping, but without chemical milling (end product) has the form that is hereinafter referred to as product form.

The near-net-shape green body together with the green form produced by a process according to the present invention basically corresponds in his aspect ratio with the raw form as well as with the product form. This means that green form and raw form as well as product form are related to each other like a equally shaped and/or equiangular image.

Time consuming post-processing steps of the raw form, conventionally carried out for example with CNC machines, are rarely necessary and, ideally, not necessary at all. Post-processing of the raw form is limited to polishing/lapping, and if necessary minor grinding.

It is possible that—depending from the material and production process—sintering does not work out homogeneously, which is due, for example, to density gradients within the green body and, hence, differential sintering. It is, however, preferred that the aspect ratio has only a deviation between green form and raw form of up to ca. ±10%, more preferably up to ca. ±5%, still more preferably up to ca. ±2%, a deviation of ca. ±1% of the aspect ratio of the green form is ideal. The absolute volumes of green form and raw form may, however, depending on the chosen method, packing density, reactivity of the powder deviate significantly from each other. Volume shrinking rates can count to 75% based on the volume of the green body and usually are above 10%.

The grinding and polishing effort of the raw form is reduced significantly due to the moulding method; ideally there is no grinding necessary at all. The surface abrasion is minimized. Abrasion can for example count 2 mm, preferably 1 mm, more preferably 0.5 mm, most preferably 0.3 mm.

The specifications above concerning the difference of product/raw form are applicable in case that the method is used to obtain the whole lens, i.e. both functional areas are produced at once. In case that the process can produce only one functional area (for example centrifugal casting), the opposite area must first be contoured (for example by chemical milling). In this case the partially finished lens, in which only one surface must be post-processed in a finishing process, is referred to as the product form. Further, in this case the terms green form, raw form and product form comprise the respective near-net-shape green contour, raw contour and product contour.

The moulds are selectively oversized as far as their dimensions and aspect ratios are concerned. Therein it is taken into account that depending on the packing density, type of material, powder conditions etc. different shrinkage of the green compact occurs during sintering. According to the shrinkage factor the mould is chosen bigger according to the according shrinkage factor.

The advantage of the moulding tool according to the present invention is that it makes a near-net-shape production of opto-ceramic lenses possible, which lenses only need very little expenditure during post-processing. Furthermore, the moulding tools according to the present invention allow for parallel moulding of multiple lenses at a time, such that the efficiency during the production of the lenses can further be increased.

The near-net-shape produced green body in the end of the entire process leads to a product with a shape produced by the negative mould of the moulding tool, which shape comprises an (optical) functional area and if applicable further areas that are attached aside the functional area.

The optical functional area meets the requirements of geometry and quality for imaging optics. It is a contour area that is rotationally symmetrical concerning the optical axis and can be described by the equation A. The area bundles diverging and parallely arriving rays to a focus or parallel divergingly arriving rays (focus in the infinite).

The optical functional area within the final product must have optical quality, i.e. it is obtainable from the raw form by polishing. By polishing the transparency of the functional area is increased compared to the raw form.

The final product can comprise further areas besides the optical functional area, which further areas serve the purpose of a storage and/or carrier (storage or carrier area) for the lens within the optical system. These do not have to show high optical transparency (transparency for visible light and/or IR-radiation). These areas can be circular, too. However, these areas can be rectangular, quadratic, trapezoidal or ellipsoidal or free formed. It is furthermore imaginable that within the storage or carrier areas recesses for the fixation of the lens in an optional location within the lens system are located (monolithic components). In the following all areas that are integrally moulded as described above, independent from their size and geometry, and not related to the functional area, are referred to as outer areas. The storage/carrier area thus belongs to the outer areas.

The moulding tools according to the present invention show contours that are suited for filling in preferably wet and/or plastic ceramic material. Therein the material preferably comprises sub-microscale ceramic powders (diameter of the powder particles about <1 μm, preferably about <500 nm, particularly preferred about <100 nm). By use of this material bodies with high transparency can be obtained after moulding and suitable sintering (for example with transmissions within the visible range of >50% of the theoretical limit, preferably >70% of the theoretical limit, particularly preferred >90% of the theoretical limit, more particularly preferred >99% of the theoretical limit).

BRIEF DESCRIPTION OF THE DRAWING

The objects, features and advantages of the invention will now be illustrated in more detail with the aid of the following description of the preferred embodiments, with reference to the accompanying figures in which:

FIG. 17 is a cross-sectional view through another lens for microscopy (objective) made using a further embodiment of a moulding tool according to the present invention;

FIG. 18 is a cross-sectional view through a lens for infrared optical applications made using another embodiment of a moulding tool according to the present invention.

Particularly preferred are the moulding tools according to the present invention for casting (slip casting, pressure slip casting, vacuum slip casting, centrifugal slip casting, gel casting) or for plastic moulding processes (extrusion) or for hot casting or die casting or pressing, for example uniaxial pressing.

Figure 1:
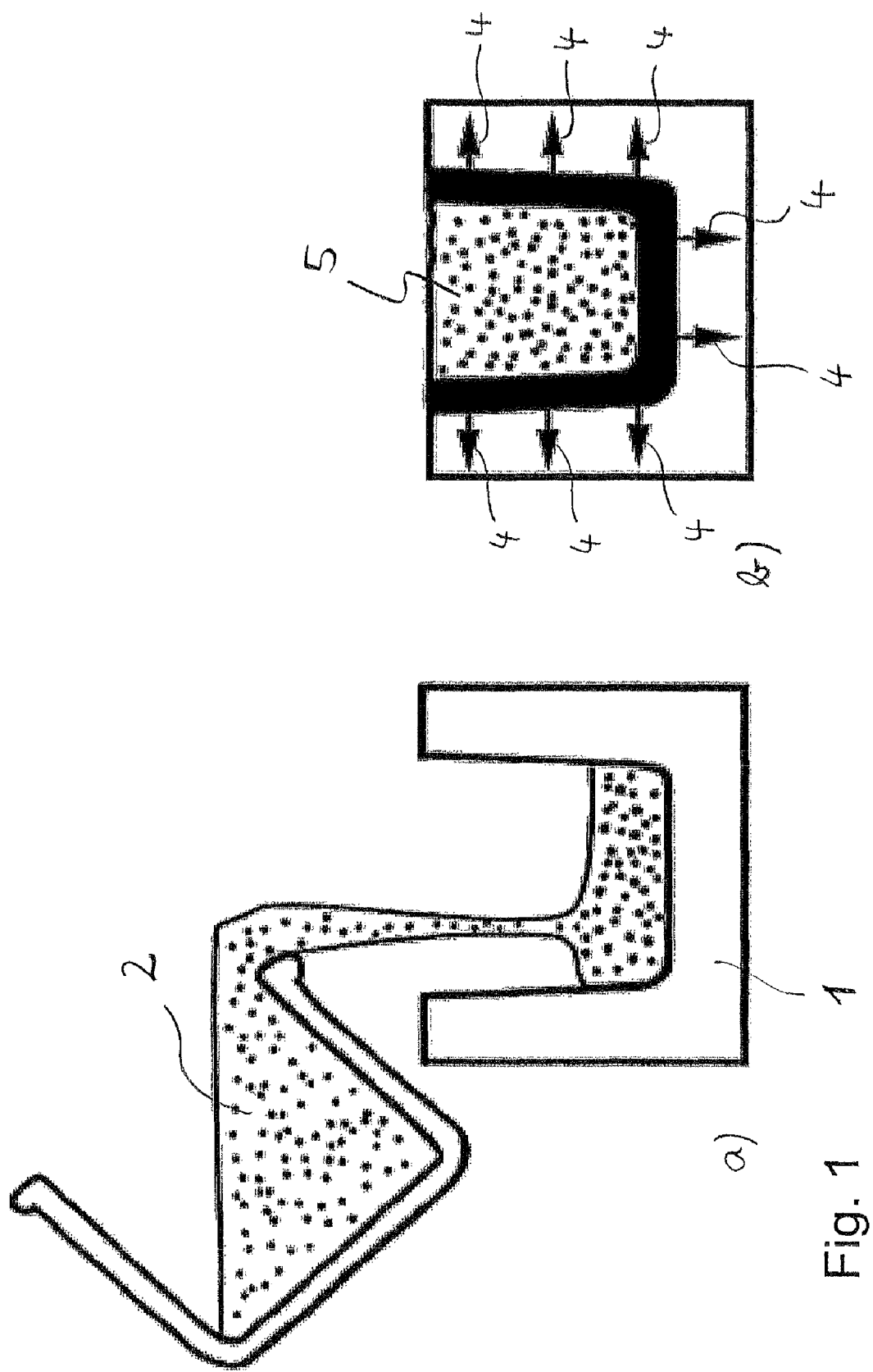
FIGS. 1a and 1b are diagrammatic cross-sectional views illustrating a preferred slip casting process using a mould according to the present invention.
Figure 2A:
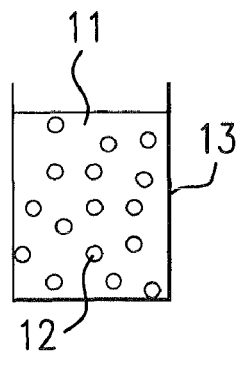
FIGS. 2a, 2b, 2c and 2d are diagrammatic cross-sectional views illustrating a preferred centrifugal slip casting process using a mould according to the present invention.
Figure 2B:
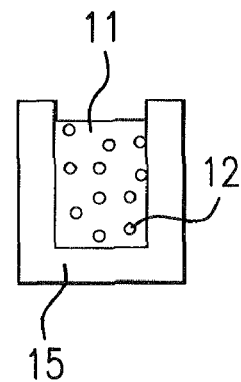
Figure 2C:
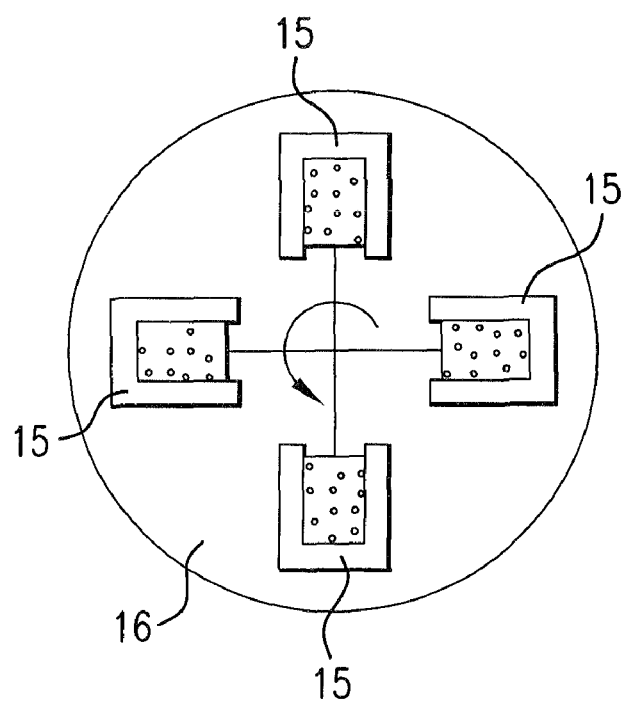
Figure 2D:

Particularly preferred is the slip casting shown in FIG. 1 or allied processes, wherein a suspension 2 is cast into the mould 1 together with a preferably nanoscale powder (see FIG. 1a). Because of the porosity of the mould, moisture is drawn from the suspension by capillary forces (pointed out with arrows 4). A sherd 5 (ceramic green body) is formed on the walls of the mould (see FIG. 1b). The cavities developing due to the shrinkage are filled by casting more fresh slip into the mould.

As a version the pressure slip casting as well as vacuum pressure casting can be applied, too.

The materials used for slip casting for the moulding tool are gypsum, resins, polymers, ceramics or zeoliths with suitable open pore structures. With respect to suspensions of nanoscale grains structures should be used that are substantially nanoscale, too. The pores must be open in any case, the pore diameters should reach from about 50 nm to about 5000 nm. The surface of the mould should be as even as possible, in order to limit eventual post-processing to a minimum (average roughness RMS smaller than about 100 nm, preferably smaller than about 50 nm, particularly preferred smaller than about 25 nm more preferred even smaller than 3 nm). Herein RMS means the so called root mean squared roughness and is calculated from the mean of the squared deviations.

As an alternative to slip casting or vacuum pressure casting/pressure slip casting the centrifugal slip casting shown in FIG. 2 can be used. In FIG. 2a the dispersed powder 12 in water 11 contained in a vessel 13 is shown. The water 11-powder 12-mixture is afterwards cast into a mould 15 (see FIG. 2b) that is located within a centrifuge 16 shown in FIG. 2c. The bottoms of mould 15 that are substantially perpendicular to the radius of the rotation circle or substantially parallel to the rotation axis and into which the solid particles are pressed by the quick rotation comprise the lens contour and form said contour into the resulting green body 18 (see FIG. 2d).

Gel casting is an example of a wet moulding process. Gel casting is a liquid moulding method, wherein a few percent of a polymerizable binder are added to the ceramic slip. If high amounts of solid are possible with still low viscosity of the slip, dimensionally stable raw bodies of even complex geometries are formed. The green bodies show low shrinkage and are obtainable by pressure-less casting or by a moulding process making use of moderate pressures (between 0.1 MPa and 50 MPa) at ambient temperature or only slightly higher temperatures. Consolidation takes place by polymerisation (<80° C.) and by drying.

In a further embodiment the moulding tools according to the present invention cannot only be used with wet plastic material. Also the pressing tools according to the present invention can be used for pressing, preferably uniaxial pressing, with accordingly contourated lens shapes.

For the use of moulding tools according to the present invention of suitable geometry for plastic moulding methods like hot casting or ceramic die casting usually hard material like steel, hardened steel etc. are used. The plastic ceramic batch is injected into the mould, thus the material is far more ductile (among others because of the higher solid particle content, but also because of more viscous solvents=binder) than in wet casting processes.

The moulds can depending on the moulding method be made from different material:

Moulds with porosity:
1) for slip casting (pore diameter 0.02 μm to 5 μm) for example gypsum, porous ceramics, clay, zeolith, resins, porous plastics (for example PMMA, polyester), glass, glass ceramics, wood;
2) for pressure slip casting, especially
    for vacuum casting especially plastics (for example vinyl polysiloxane, polyvinyl silazan), wood, ceramic, glass,
    for high pressure slip casting (1-5 to 4 MPa) (uniform microporous structure, pore diameter 20 to 40 μm with a porosity of 30 to 40 Vol %, pressure resistance>30 MPa, high wear resistance especially microporous moulds of plastics (for example PMMA), ceramics (for example titanates, nitrides, carbides)), Mid pressure casting (0.15-0.35 MPa) (uniform microporous structure, pore diameter 1 to 40 μm with a porosity of 30 to 40 Vol %, good wear resistance especially ceramics (for example titanates, nitrides), plastics);

Moulds without porosity 3) for ceramic die casting
   low pressure die casting (temperature resistance 60-110° C., pressure resistance 0.25 to 5 MPa) and hot casting (60-110° C., 0.1 to 5 MPa), especially plastics (for example vinyl polysiloxane), metal (steel, zinc, magnesium, aluminium and copper alloys (brass, bronze)), glass, glass ceramics, ceramics,
   high pressure die casting (120 to 220° C., >50 MPa), especially hard metal, steel, carbide;
4) for centrifugal casting for example sealing material, glass, glass ceramics, ceramics;
5) for gel casting for example metal (aluminium (hard anodised aluminium is better), zinc, magnesium, aluminium and copper alloys), glass, glass ceramics, ceramic, clay, plastics (polyvinyl chloride (PVC), polystyrene (PS), polyethylene (PE), sealing material (for example silicon rubber);
6) for isostatic pressing especially elastomers (latex, nitrile rubber) and
7) for hot pressing especially steel, tungsten carbide, silicon carbide, graphite.

The moulds should be used for the production of transparent ceramics (opto-ceramics). As materials all of the above-mentioned can be taken into consideration, if they comprise preferably cubic crystal structure within the crystalline phase. In detail these systems are like spinels ($MgAl_2O_3$), sesquioxides ($Y_2O_3$, garnets like YAG, AlON, perovskites, cubic zirconium oxides etc.) and/or isotype mixed crystal systems of the above families. Non-cubic phases like $Al_2O_3$ can be processed, too, however, it has to be taken care of a suitable crystal structure after sintering, especially as far as high transparency is concerned.

A first important step is the illustration of at least one definedly curved surface of the lens. Ideally, the whole lens, i.e. additionally the opposite surface is illustrated in a near-net-shape, too. In principal, a multitude of spherical, aspherical, convex and concave, globular or cylindrical surfaces can be provided. Also such geometries that show ideal sphere surfaces or cylindrical lenses are included.

As exemplary embodiments lens types are shown in the following. The moulding tools according to the present invention comprise at least one of the curved surfaces as negative mould.

Figure 3:
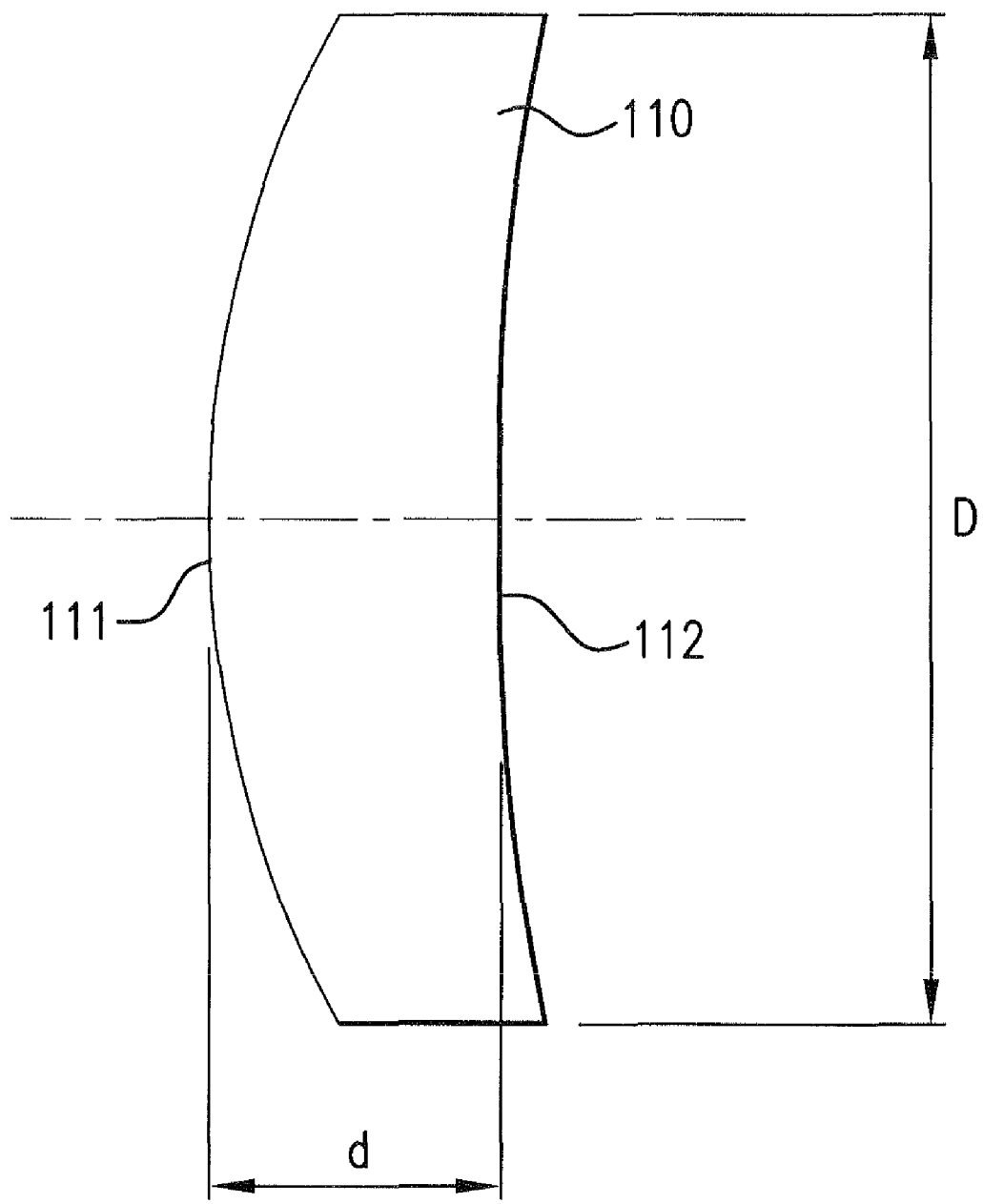
FIG. 3 is a cross-sectional view through a lens produced by a process including using a moulding tool according to the present invention.

Exemplary Embodiment 1 for a Lens 110 (See FIG. 3):

FIG. 3 shows a lens 110 produced by use of the moulding tool according to the present invention for the application of digital projection with the following parameters:

|  | left surface 111 | right surface 112 |
|---|---|---|
| diameter D | 15 mm | |
| thickness d | 4 mm | |
| Curve | convex | concave |
| radius of the curve | 17.77 mm | 36.24 mm |
| K | −0.458 (asphere) | 0 (sphere) |
| a1 | 2.92E−3 | 0 |
| a2 | 3.87E−3 | 0 |
| a3 | 4.40E−8 | 0 |
| a4 | 0 | 0 |
| application | digital projection | |

Figure 4:
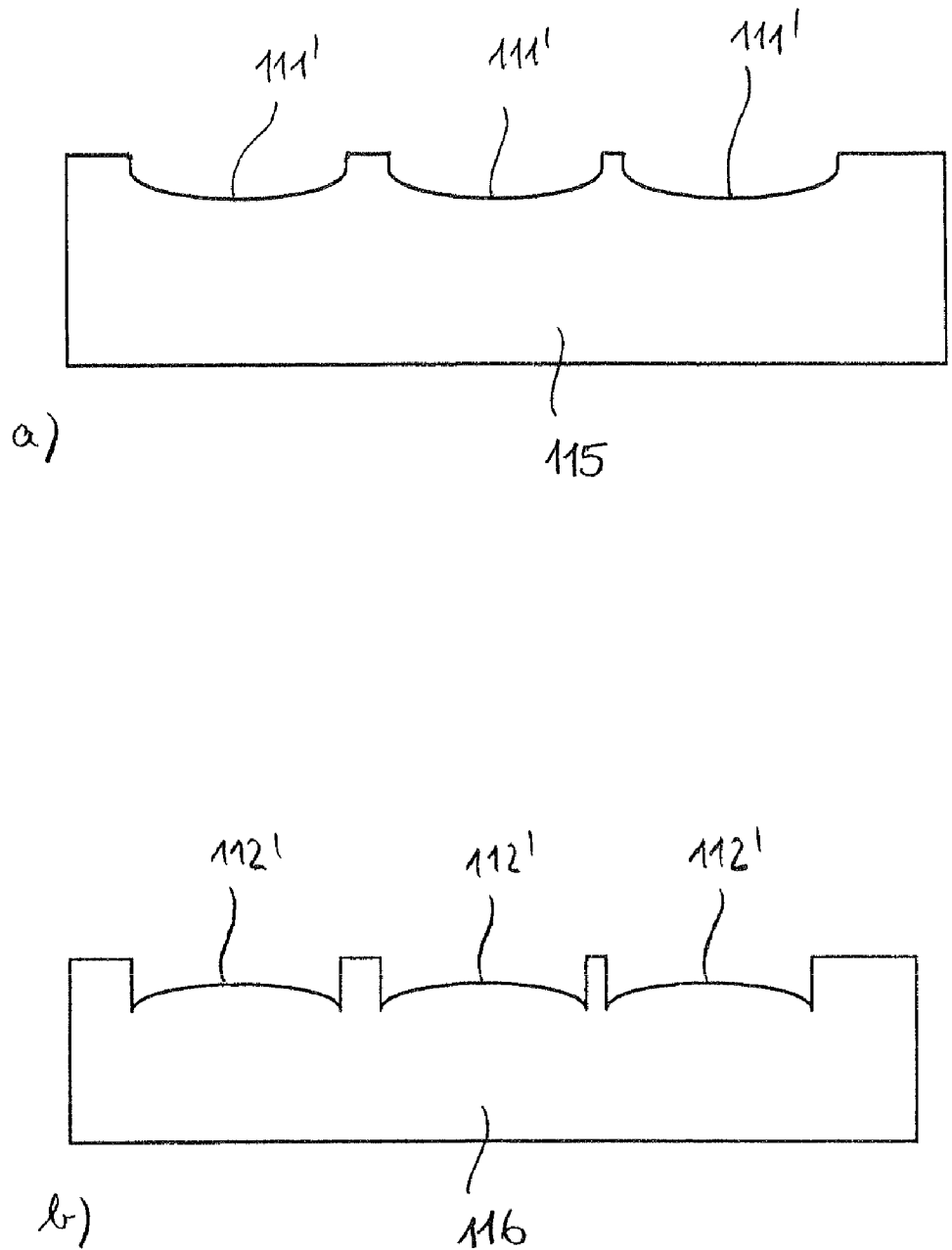
FIGS. 4a and 4b are cross-sectional views through respective moulding tool parts according to the present invention for three lenses.

A moulding tool according to the present invention 115 for slip casting is shown in FIG. 4a, displaying the convex left surface 111 with the contour 111'. A moulding tool according to the present invention 116 for slip casting is shown in FIG. 4b, displaying the concave right surface 112 with the contour 112'. In any of the shown moulding tools 115 and 116 there are contours 111' and 112' for three lenses, being laterally located next to each other. The moulding tool does not have to be limited to the contours of three lenses but could also comprise only one contour, two contours or more than three contours.

In order to obtain a body that is as massive and as homogeneous as possible, the volume shrinkage by sherd formation can be balanced by refilling slip into the mould.

Figure 5:
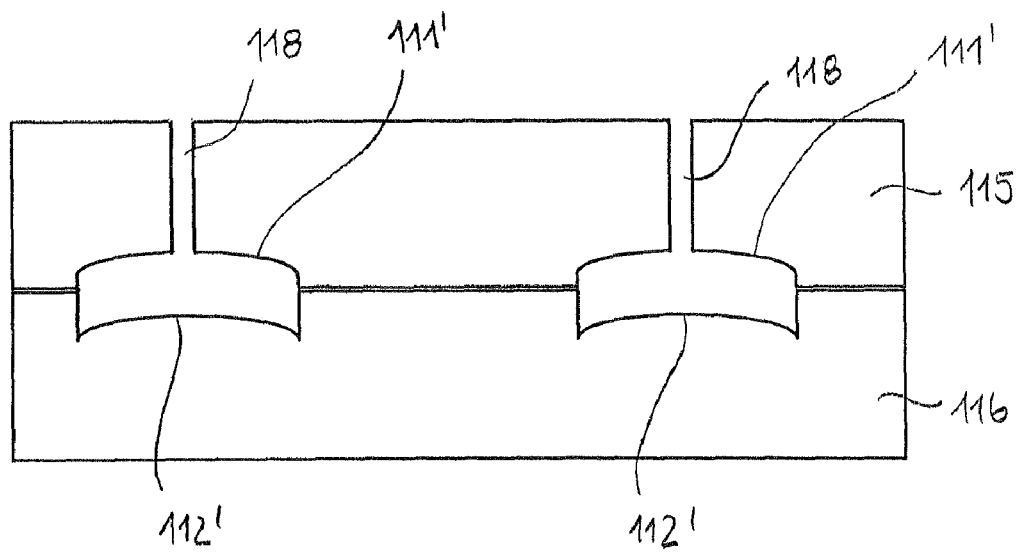
FIG. 5 is a cross-sectional view through a moulding tool pair according to the present invention for two lenses.

FIG. 5 shows the moulding tool pairs 115, 116 for slip casting located above each other, wherein by the entire tool consisting of the two tool pairs 115, 116 displays both surfaces 111, 112 of the lens 110. The pair of contours 111' and 112' resting above each other together forms the shape of a lens. In order to obtain a body that is as massive and as homogeneous as possible, the volume shrinkage by sherd formation can be balanced by re-filling slip into the mould. The re-filling of slip takes place through a channel 118 that is present within the moulding tool 115 leading to each of the lens contours.

In alternative embodiments of the present invention the channel 118 may be tilted, i.e. forms an angle of at least 45° to the horizontal, and there can be more than one channel per contour. A second channel 118 could be used to conduct the escaping air.

Figure 6:
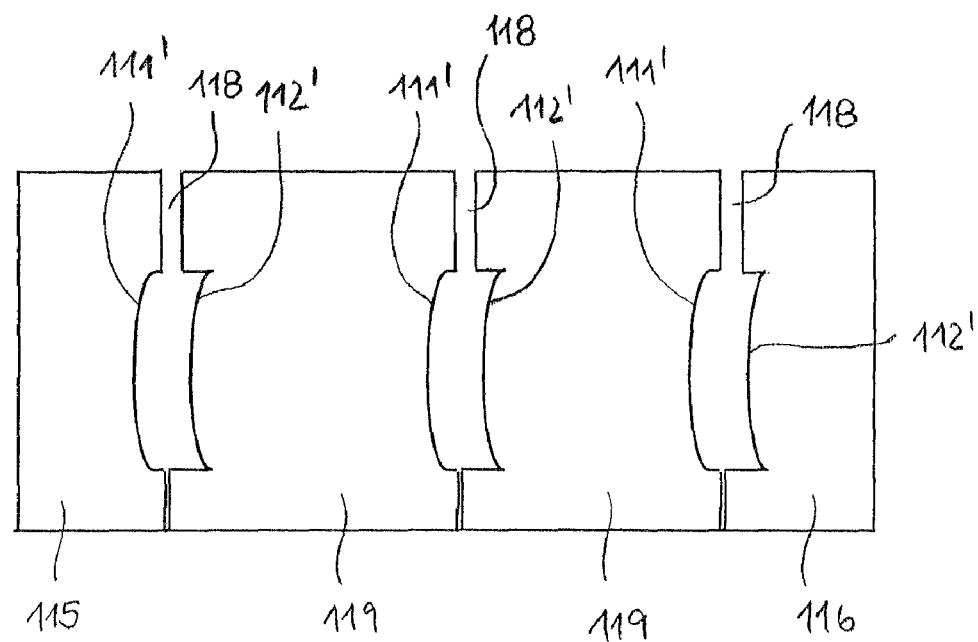
FIG. 6 is a cross-sectional view through an alternative embodiment of a moulding tool pair according to the present invention for two lenses.

FIG. 6 shows an alternative embodiment of the present invention for a combined moulding tool that is especially suitable for volume casting. Here, the negative cavities can be arranged perpendicular to each other. The moulding tool comprises a first part 115, displaying the left contour 111'. Onto this part two second parts 119 are attached, displaying the right contour 112' on their left side and the left contour 111' on their right side. The third part that is located on the outer right side of the tool 116 displays contour 112' on its left side. Each two contours facing each other 111' and 112' form the geometry of a lens. The contours 111' and 112' hence lie parallely to each other. Also parallel to the contours 111' and 112' are the channels 118 being located on the upside of the respective lens mould.

In this moulding tool as shown in FIG. 6 it is also possible that the channels 118 are tilted and/or there can be more than one channel 118 per contour.

Figure 7:
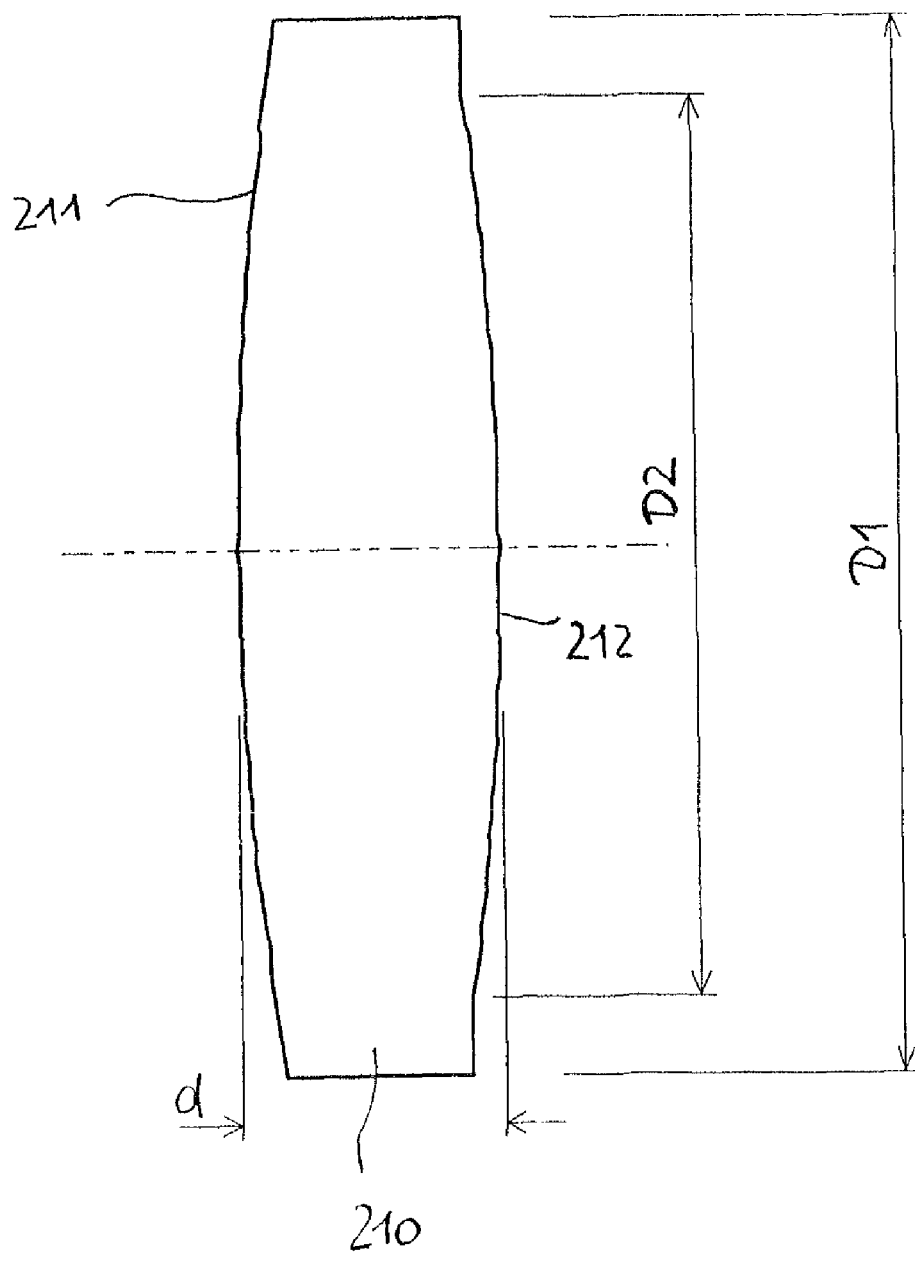
FIG. 7 is a cross-sectional view through a lens made using a moulding tool according to the present invention.

Embodiment 2 for a Lens 210 (See FIG. 7):

FIG. 7 shows a lens 210 obtained by using a moulding tool according to the present invention for application in the field of digital photography (DSC camera) with the following parameters:

|  | left surface 211 | right surface 212 |
|---|---|---|
| diameter | D1 = 9.89 mm | D2 = 8.47 mm |
| thickness d | 2.86 mm | |
| Curve | convex | convex |
| radius of the curve | 26.332 mm | |
| K | 0 (sphere) | 0 (sphere) |
| application | DSC camera | |

Figure 8:
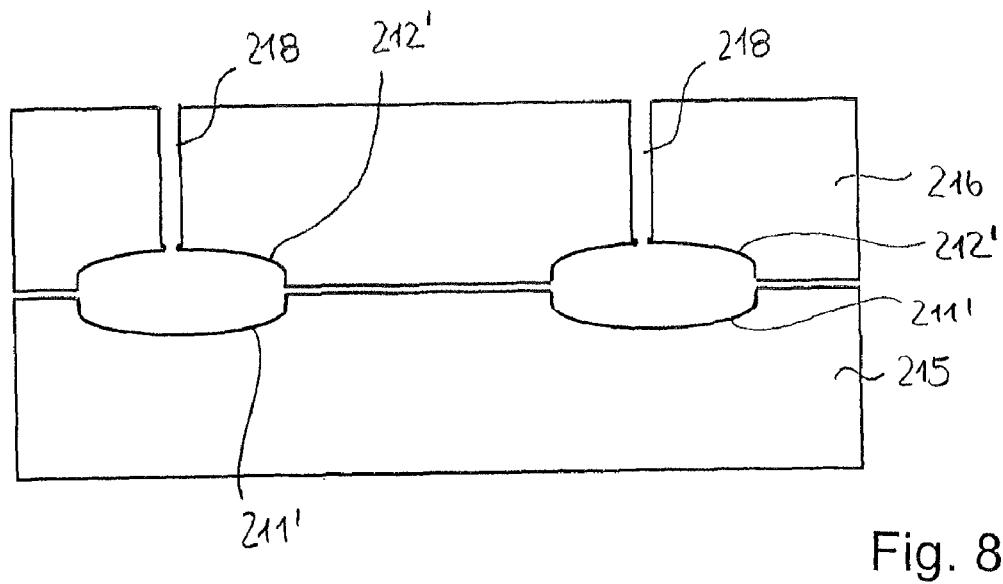
FIG. 8 is a cross-sectional view through another embodiment of a moulding tool pair according to the invention for making two lenses.

FIG. 8 shows moulding tool pairs 215, 216 resting above each other for slip casting, wherein the entire tool composed from moulding tool parts 215, 216 displays both surfaces 211, 212 of lens 210. The pairs of contours 211' and 212' each show the shape of a lens. In order to obtain a body that is as massive and as homogeneous as possible, the volume shrinkage by sherd formation can be balanced by re-filling slip into the mould. The re-filling of slip takes place through a channel 218 that is present within the moulding tool 215 leading to each of the lens contours.

Figure 9:
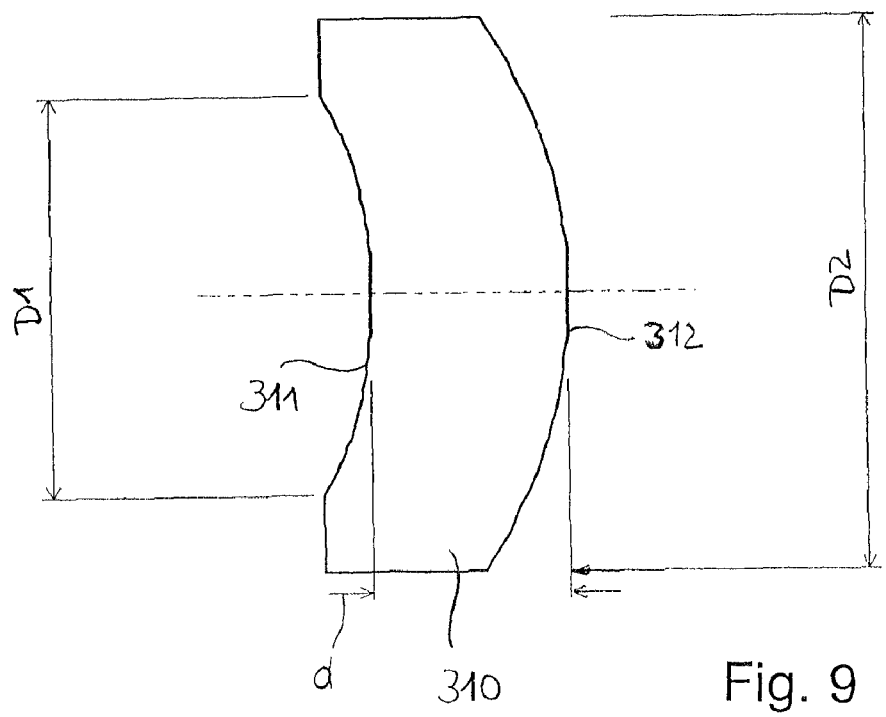
FIG. 9 is a cross-sectional view through a lens for digital photography made using an alternative embodiment of a moulding tool according to the present invention.

Embodiment 3 for a Lens 310 (See FIG. 9):

FIG. 9 shows a lens 310 obtained by using a moulding tool according to the present invention for application in the field of digital photography (SLR camera) with the following parameters:

|  | left surface 311 | right surface 312 |
| --- | --- | --- |
| diameter | D1 = 8.55 mm | D2 = 11.82 mm |
| thickness d | 3.4 mm | |
| Curve | concave | convex |
| radius of the curve | 13.68 mm | 12.46 mm |
| K | 5.22 (asphere) | 0 (sphere) |
| a1 | 0 | 0 |
| a2 | −9.523E−5 | 0 |
| a3 | 0 | 0 |
| a4 | 5.653E−9 | 0 |
| application | digital photography (SLR) | |

Figure 10:
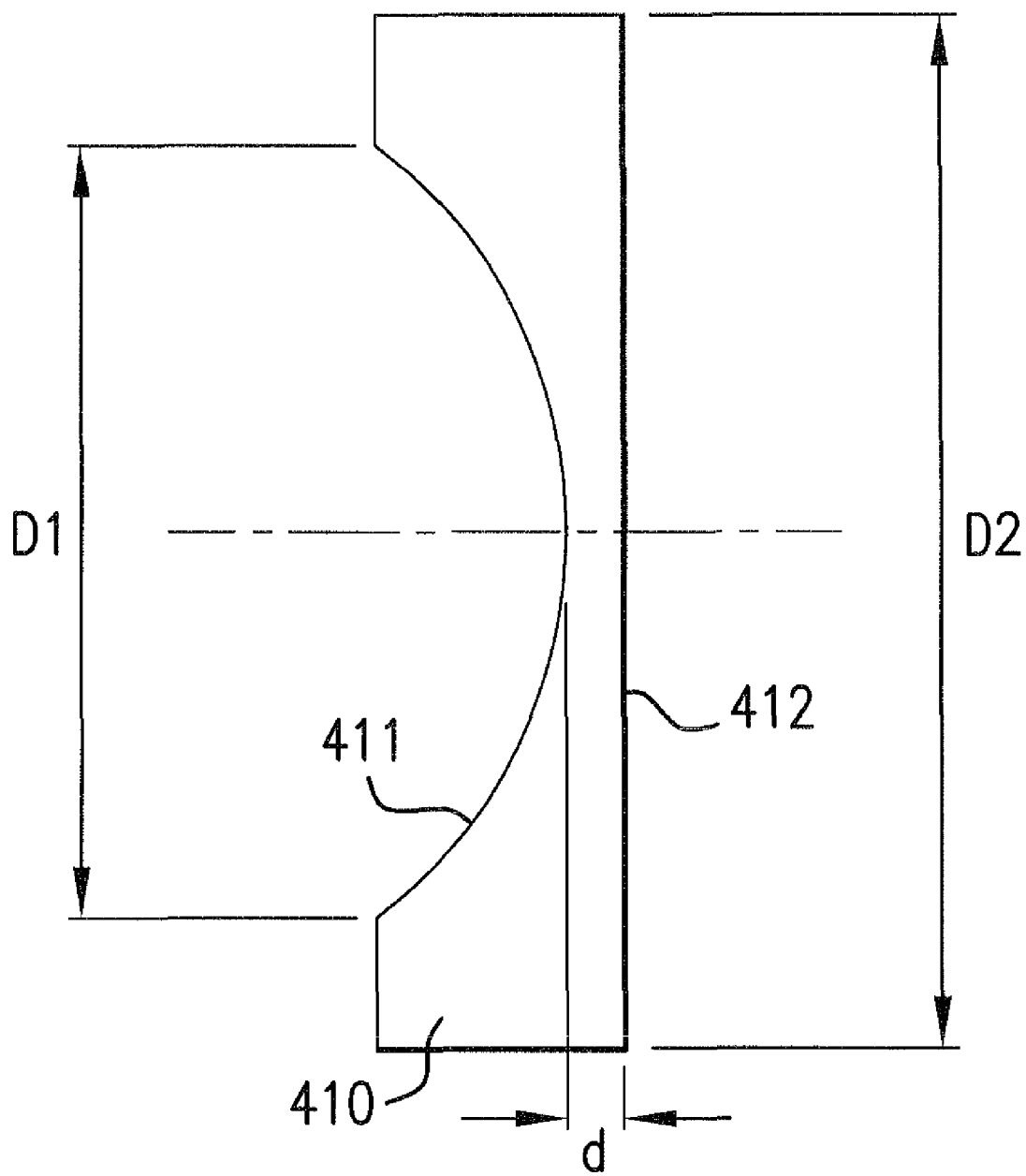
FIG. 10 is a cross-sectional view through another lens for digital photography made using an alternative embodiment of a moulding tool according to the present invention.

Embodiment 4 for a Lens 410 (See FIG. 10):

FIG. 10 shows a lens 410 obtained by using a moulding tool according to the present invention for application in the field of digital photography (DSC camera) with the following parameters:

|  | left surface 411 | right surface 412 |
| --- | --- | --- |
| diameter | D1 = 20.25 mm | D2 = 26.83 mm |
| thickness d | 1.5 mm | |
| Curve | concave | concave |
| radius of the curve | 12.11 mm | 556.0 mm |
| K | 0 (sphere) | 0 (sphere) |
| a1 | 0 | 0 |
| a2 | 0 | 0 |
| a3 | 0 | 0 |
| a4 | 0 | 0 |
| application | digital photography (DSC) | |

Figure 11:
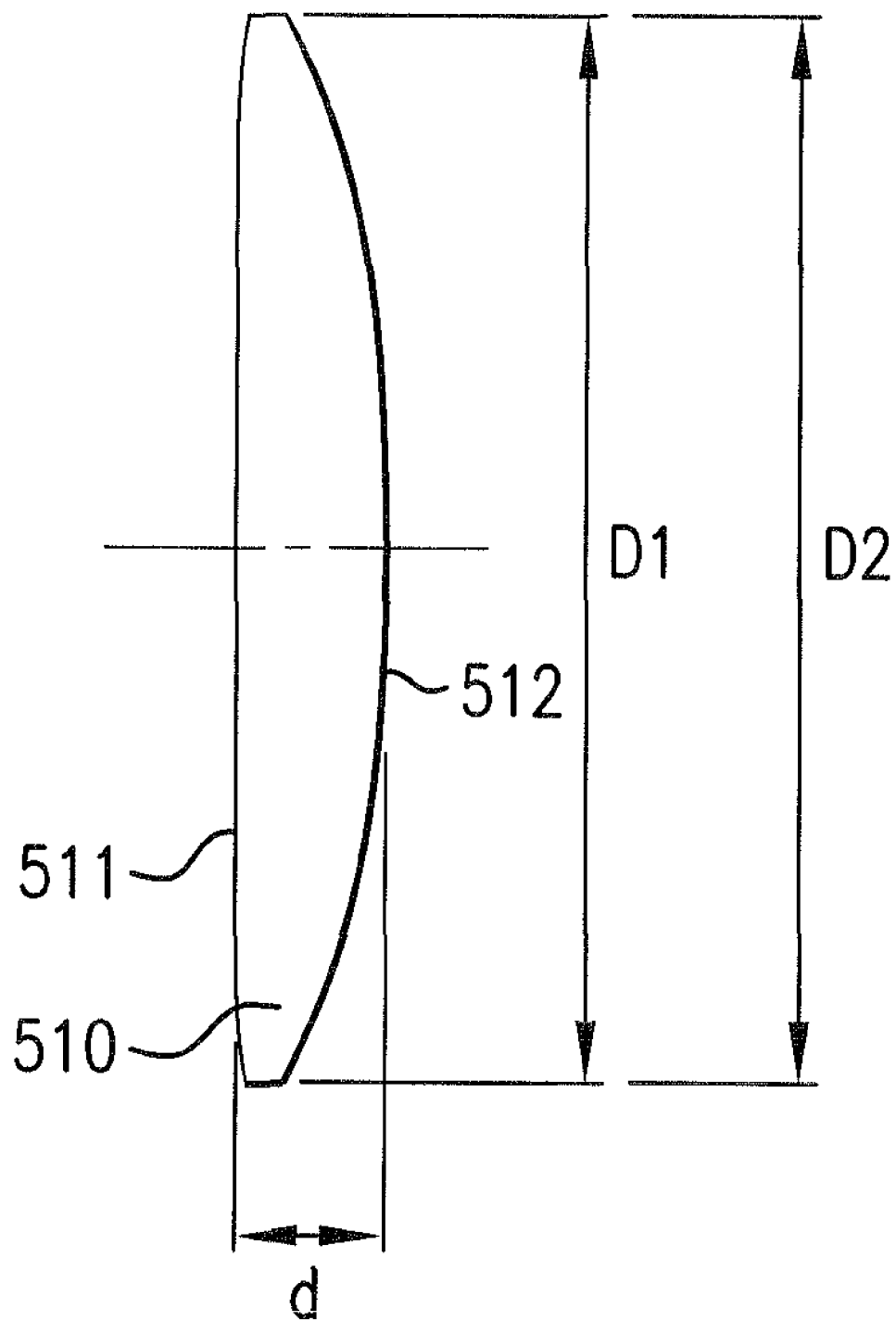
FIG. 11 is a cross-sectional view through an additional lens for digital photography made using an additional embodiment of a moulding tool according to the present invention.

Embodiment 5 for a Lens 510 (See FIG. 11):

FIG. 11 shows a lens 510 obtained by using a moulding tool according to the present invention for application in the field of digital photography (DSC camera) with the following parameters:

|  | left surface 511 | right surface 512 |
| --- | --- | --- |
| diameter | D1 = 19.918 mm | D2 = 19.913 mm |
| thickness d | 2.43 mm | |
| Curve | concave | convex |
| radius of the curve | 227264 mm | 99.5 mm |
| K | 0 | 0 |
| a1 | 0 | 0 |
| a2 | −2.21E−5 (asphere) | −1.09E−4 (asphere) |
| a3 | 0 | 0 |
| a4 | −1.71E−9 (asphere) | −7.26E−9 (asphere) |
| a4 | 6.52E−11 (asphere) | 7.04E−11 (asphere) |
| application | digital photography (DSC) | |

Figure 12:
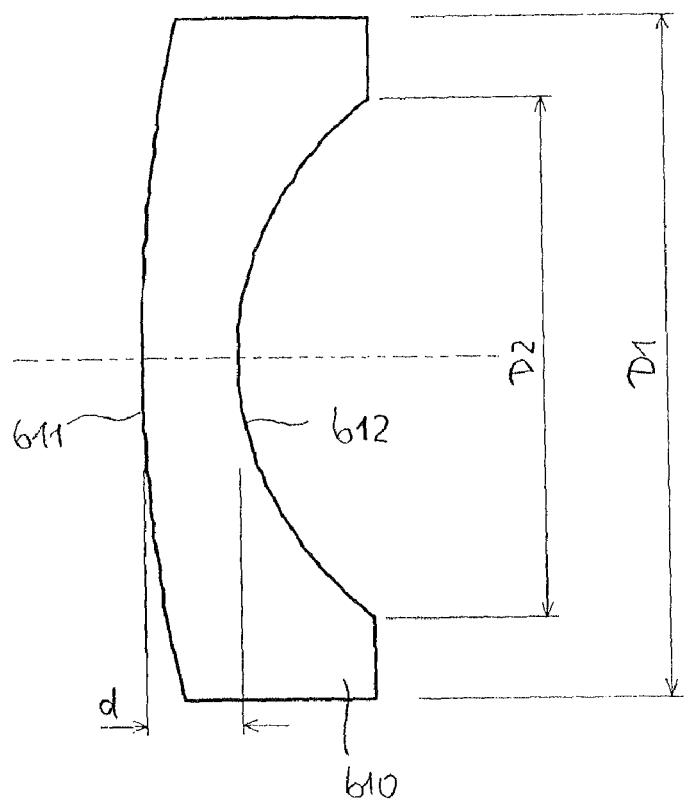
FIG. 12 is a cross-sectional view through a further lens for digital photography made using a further embodiment of a moulding tool according to the present invention.

Embodiment 6 for a Lens 610 (See FIG. 12):

FIG. 12 shows a lens 610 obtained by using a moulding tool according to the present invention for application in the field of digital photography (DSC camera) with the following parameters:

|  | left surface 611 | right surface 612 |
| --- | --- | --- |
| diameter | D1 = 8.65 mm | D2 = 6.62 mm |
| thickness d | 1.2 mm | |
| Curve | convex | convex |
| radius of the curve | 20.453 mm | 3.69 mm |
| K | 0 | −0.974 |
| a1 | 0 | 0 |
| a2 | 0 | 1.438E−3 |
| a3 | 0 | 2.731E−5 |
| a4 | 0 | 1.564E−6 |
| a5 | 0 | 0 |
| application | digital photography (DSC) | |

Figure 13:
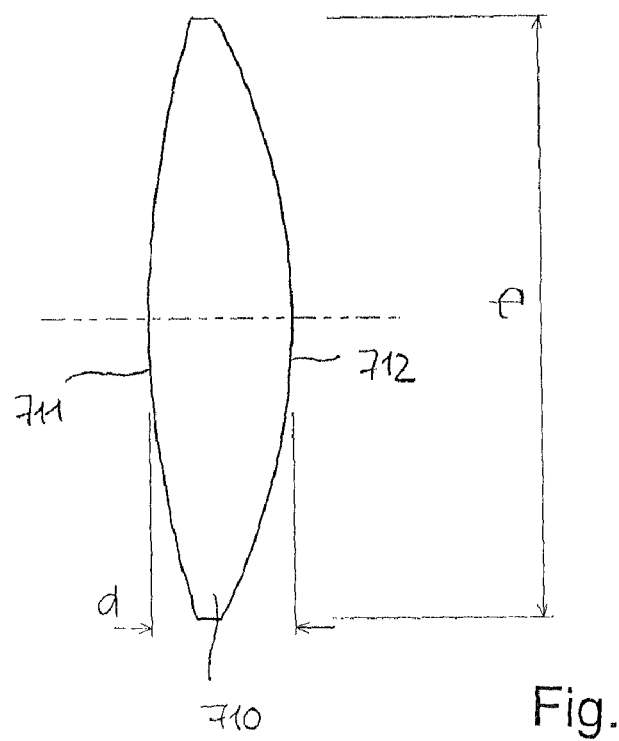
FIG. 13 is a cross-sectional view through a lens (ocular) for microscopy made using a further embodiment of a moulding tool according to the present invention.

Embodiment 7 for a Lens 710 (See FIG. 13):

FIG. 13 shows a lens 710 obtained by using a moulding tool according to the present invention for application in the field of microscopy (ocular) with the following parameters:

|  | left surface 711 | right surface 712 |
| --- | --- | --- |
| diameter | 44.20 mm | |
| thickness d | 10.74 mm | |
| Curve | convex | convex |
| radius of the curve | 72.85 mm | 46.32 mm |
| K | 0 (sphere) | 0 (sphere) |
| a1 | 0 | 0 |
| a2 | 0 | 0 |
| a3 | 0 | 0 |
| a4 | 0 | 0 |
| a4 | 0 | 0 |
| application | microscopy (ocular) | |

Figure 14:
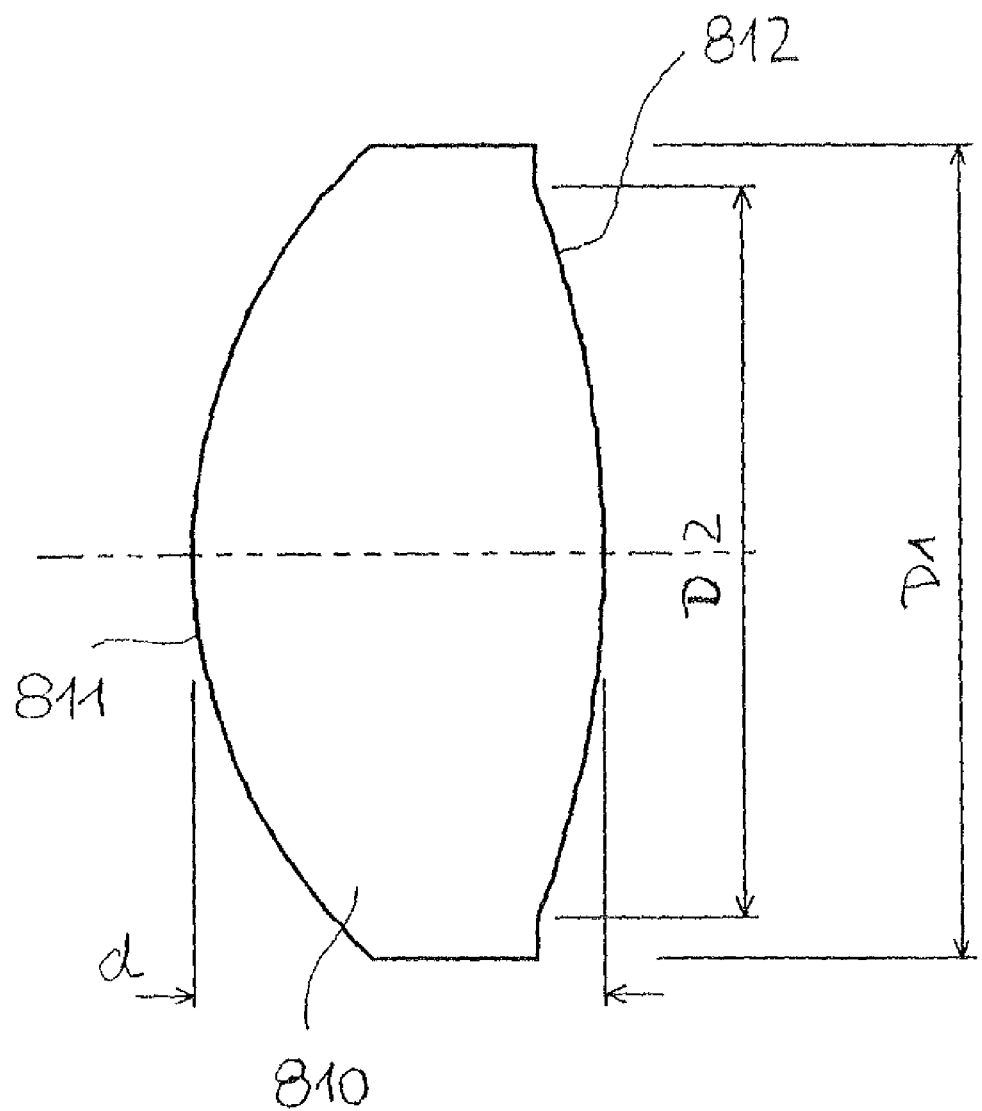
FIG. 14 is a cross-sectional view through another lens for microscopy (objective) made using an alternative embodiment of a moulding tool according to the present invention.

Embodiment 8 for a Lens 810 (See FIG. 14):

FIG. 14 shows a lens 810 obtained by using a moulding tool according to the present invention for application in the field of microscopy (objective) with the following parameters:

|  | left surface 811 | right surface 812 |
| --- | --- | --- |
| diameter | D1 = 8.97 mm | D2 = 8.04 mm |
| thickness d | 4.52 mm | |
| Curve | convex | convex |
| radius of the curve | 6.11 mm | 11.52 mm |
| K | 0 (sphere) | 0 (sphere) |
| a1 | 0 | 0 |
| a2 | 0 | 0 |
| a3 | 0 | 0 |
| a4 | 0 | 0 |
| a4 | 0 | 0 |
| application | microscopy (objective) | |

Figure 15:
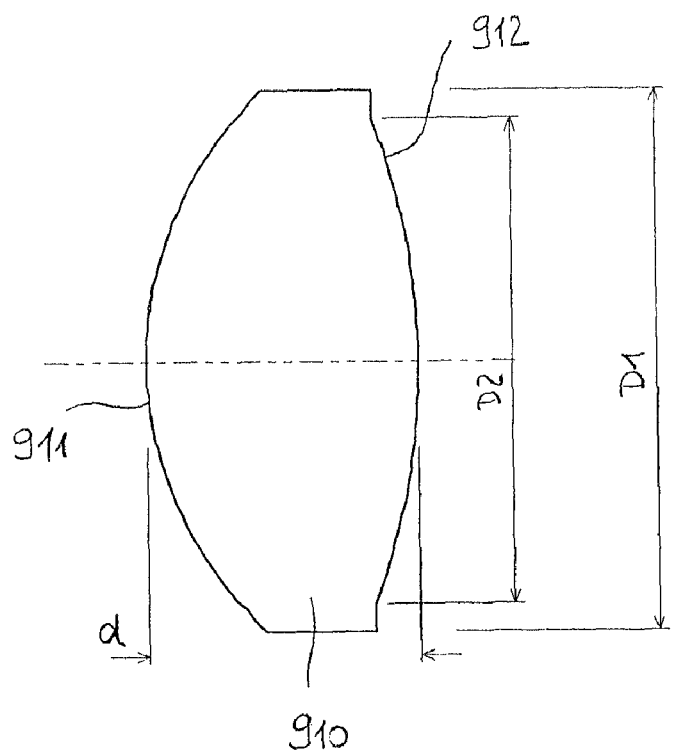
FIG. 15 is a cross-sectional view through an additional lens for microscopy (objective) made using an additional embodiment of a moulding tool according to the present invention.

Embodiment 9 for a Lens 910 (See FIG. 15):

FIG. 15 shows a lens 910 obtained by using a moulding tool according to the present invention for application in the field of microscopy (objective) with the following parameters:

|  | left surface 911 | right surface 912 |
| --- | --- | --- |
| diameter | D1 = 8.97 mm | D2 = 8.04 mm |
| thickness d | 4.52 mm | |
| Curve | convex | convex |
| radius of the curve | 6.11 mm | 11.52 mm |
| K | 0 (sphere) | 0 (sphere) |
| a1 | 0 | 0 |
| a2 | 0 | 0 |
| a3 | 0 | 0 |

-continued

|  | left surface 911 | right surface 912 |
|---|---|---|
| a4 | 0 | 0 |
| a4 | 0 | 0 |
| application | microscopy (objective) | |

Figure 16:
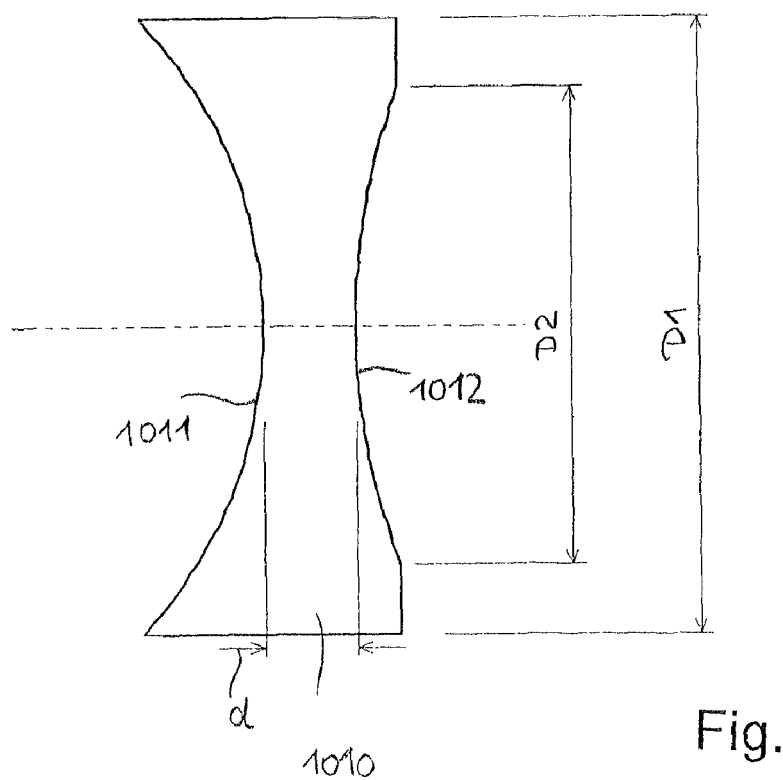
FIG. 16 is a cross-sectional view through a further lens (ocular) for microscopy made using a further embodiment of a moulding tool according to the present invention.

Embodiment 10 for a Lens 1010 (See FIG. 16):

FIG. 16 shows a lens 1010 obtained by using a moulding tool according to the present invention for application in the field of microscopy (ocular) with the following parameters:

|  | left surface 1011 | right surface 1012 |
|---|---|---|
| diameter | D1 = 38.1 mm | D2 = 29.5 mm |
| thickness d | 5.05 mm | |
| Curve | concave | concave |
| radius of the curve | 30.84 mm | 48.88 mm |
| K | 0 (sphere) | 0 (sphere) |
| a1 | 0 | 0 |
| a2 | 0 | 0 |
| a3 | 0 | 0 |
| a4 | 0 | 0 |
| a4 | 0 | 0 |
| application | microscopy (ocular) | |

Embodiment 11 for a Lens 1110 (See FIG. 17)

FIG. 17 shows a lens 1110 obtained by using a moulding tool according to the present invention for application in the field of microscopy (objective) with the following parameters:

|  | left surface 1111 | right surface 1112 |
|---|---|---|
| diameter | D1 = 5.87 mm | D2 = 6.4 mm |
| thickness d | 1.95 mm | |
| Curve | concave | concave |
| radius of the curve | 4.59 mm | 5.28 mm |
| K | 0 (sphere) | 0 (sphere) |
| a1 | 0 | 0 |
| a2 | 0 | 0 |
| a3 | 0 | 0 |
| a4 | 0 | 0 |
| a4 | 0 | 0 |
| application | microscopy (objective) | |

Embodiment 12 for a Lens 1210 (See FIG. 18)

FIG. 18 shows a lens 1210 obtained by using a moulding tool according to the present invention for application in the field of IR optics with the following parameters:

|  | left surface 1211 | right surface 1212 |
|---|---|---|
| diameter | D1 = 96.0 mm | D2 = 92.5 mm |
| thickness d | 8.7 mm | |
| Curve | convex | concave |
| radius of the curve | 128.4 mm | 186.9 mm |
| K | 0 (sphere) | 0 (sphere) |
| a1 | 0 | 0 |
| a2 | 0 | 0 |
| a3 | 0 | 0 |
| a4 | 0 | 0 |
| a4 | 0 | 0 |
| application | IR optics | |

Figure 19:
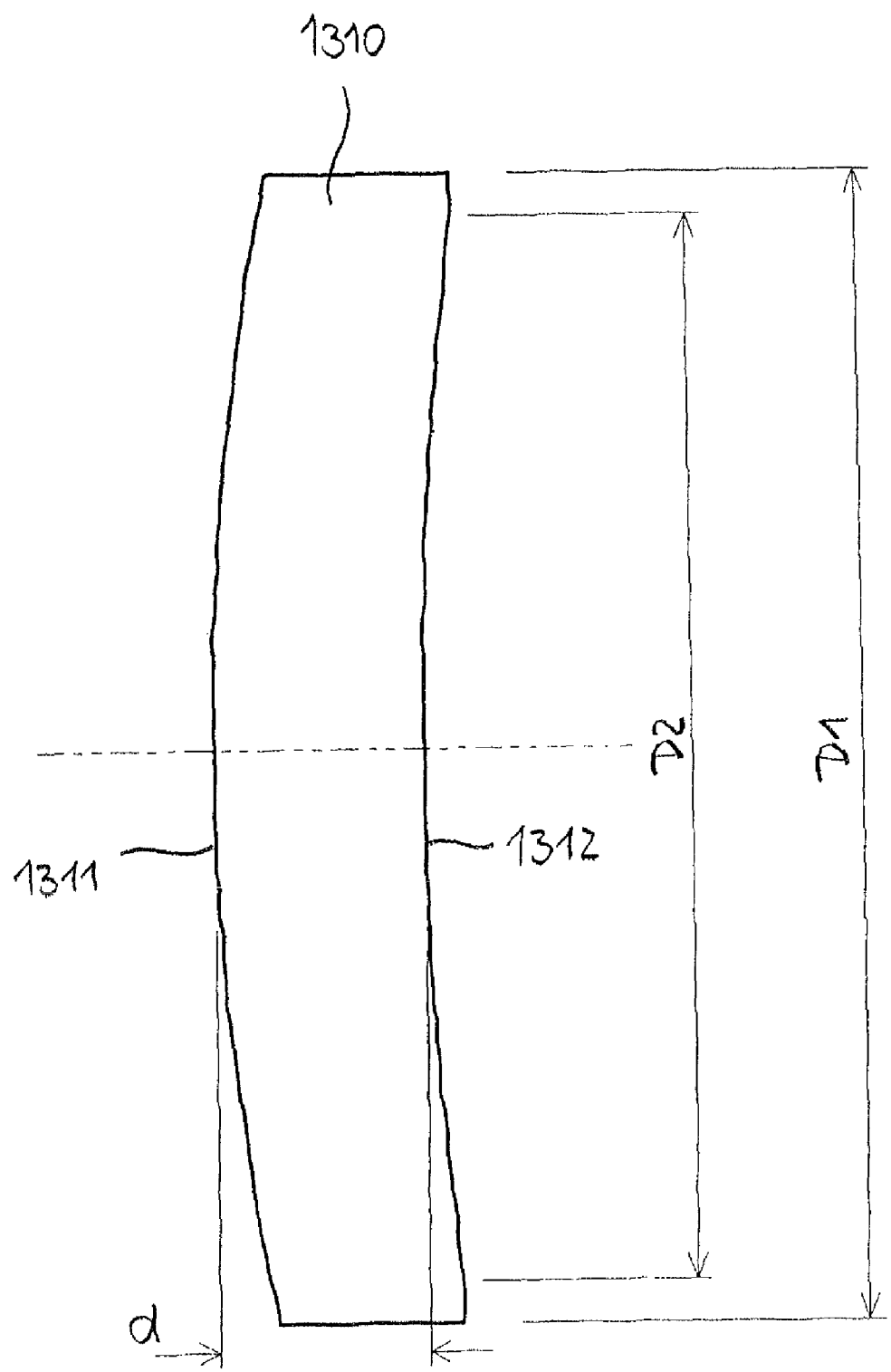
FIG. 19 is a cross-sectional view through another different lens for infrared optical applications made using a further embodiment of a moulding tool according to the present invention.

Embodiment 13 for a Lens 1310 (See FIG. 19):

FIG. 19 shows a lens 1310 obtained by using a moulding tool according to the present invention for application in the field of IR optics with the following parameters:

|  | left surface 1311 | right surface 1312 |
|---|---|---|
| diameter | D1 = 31.96 mm | D2 = 29.53 mm |
| thickness d | 7.0 mm | |
| Curve | convex | concave |
| radius of the curve | 63.3 mm | 90.1 mm |
| K | 0 (sphere) | 0 (sphere) |
| a1 | 0 | 0 |
| a2 | 0 | 0 |
| a3 | 0 | 0 |
| a4 | 0 | 0 |
| a4 | 0 | 0 |
| application | IR optics | |

The lenses specified above (and the derived contours of the moulding tools) are only indicated as examples and they do not limit the scope of the invention. Altogether moulding tools for all lens geometries are included in the present invention, especially planar convex lenses, biconvex lenses symmetrical, best form lenses, concave convex lenses, planar concave lenses, biconcave lenses symmetrical, cylinder lenses, spherical lenses, aspherical condenser lenses, gradient index lenses and micro-lens arrays.

We claim:

1. A method for producing at least one rotationally symmetrical lens, said lens consisting of an opto-ceramic, comprising the following process step:
moulding a green body using a moulding tool, wherein at least one surface of said lens is described by the following equation A:

$$y = \frac{cx^2}{1 + \sqrt{1 - (k+1)c^2 x^2}} + a_1 x^2 + a_2 x^4 + a_3 x^6 + a_4 x^8 + \ldots, \quad (A)$$

wherein
x designates a perpendicular distance from an optical axis of said lens;
y gives a position on the optical axis;
k is a conic constant and has a value of −200 to +200;
c=1/R wherein R is a radius of curvature of the at least one surface;
$a_1, a_2, a_3, a_4, \ldots$ are each $<10^{-1}$;
wherein the moulding tool comprises a near-net-shape negative mould for shaping the green body, said near-net-shape negative mould having a shaping surface, which is described by the following equation B:

$$y1 = \frac{cz^2}{1 + \sqrt{1 - (k+1)c^2 z^2}} + a_1 z^2 + a_2 z^4 + a_3 z^6 + a_4 z^8 + \ldots, \quad (B)$$

wherein x, k, c, $a_1, a_2, a_3, a_4, \ldots$ have the same meaning and values as in said formula A;
y1 is a location on the optical axis;
z=|x|+b; and
wherein b is a constant with a value greater than 0 and less than 0.3 mm and is a measure of a deviation of the shaping surface of the near-net-shape negative mould from the at least one surface of said lens to be moulded.

2. A method of producing at least one rotationally symmetrical lens, said lens consisting of an opto-ceramic, said method consisting of the steps a to g:
- a) providing a powder of basic materials,
- b) optionally milling the basic materials,
- c) moulding a green body using a moulding tool, wherein at least one surface of said lens is described by the following equation A:

$$y = \frac{cx^2}{1 + \sqrt{1-(k+1)c^2x^2}} + a_1x^2 + a_2x^4 + a_3x^6 + a_4x^8 + \ldots, \quad (A)$$

wherein x designates a perpendicular distance from an optical axis of said lens;

y gives a position on the optical axis;

k is a conic constant and has a value of −200 to +200;

c=1/R wherein R is a radius of curvature of the at least one surface;

$a_1, a_2, a_3, a_4, \ldots$ are each $<10^{-1}$;

wherein the moulding tool comprises a near-net-shape negative mould for shaping the green body, said near-net-shape negative mould having a shaping surface, which is described by the following equation B:

$$y1 = \frac{cz^2}{1 + \sqrt{1-(k+1)c^2z^2}} + a_1z^2 + a_2z^4 + a_3z^6 + a_4z^8 + \ldots, \quad (B)$$

wherein $x, k, c, a_1, a_2, a_3, a_4, \ldots$ have the same meaning and values as in said formula A;

y1 is a location on the optical axis;

z=|x|+b; and wherein b is a constant with a value greater than 0 and less than 0.3 mm and is a measure of a deviation of the shaping surface of the near-net-shape negative mould from the at least one surface of said lens to be moulded,

- d) optionally drying and/or debindering the green body,
- e) sintering,
- f) hot isostatic pressing (HIP), and
- g) optionally thermic post-processing.

3. The method according to claim 1, wherein the opto-ceramic to be produced after finishing the entire production process has transmission values of about >50% or 70% of the theoretical limit.

4. The method according to claim 1, wherein the opto-ceramic to be produced after finishing the entire production process has transmission values of about >90% or 99% of the theoretical limit.

5. The method according to claim 1, wherein the opto-ceramic to be produced is selected from the group of cubic garnets, cubic perovskites, cubically stabilized zirconium oxide, cubically stabilized hafnium oxide, cubic sesquioxides, isotypical cubic mixed crystal phases of the aforesaid oxides with other oxides and Mg—Al-spinels.

6. The method according to claim 5, wherein said cubic garnets are Y—Al-garnets.

7. The method according to claim 5, wherein said cubic sesquioxides are selected from the group consisting of $Y_2O_3$, $Lu_2O_3$, $Yb_2O_3$, $In_2O_3$ and $Sc_2O_3$.

8. The method according to claim 5, wherein said other oxides are $Gd_2O_3$, $La_2O_3$, $ZrO_2$, $HfO_2$, Mg—Al-spinels of an approximate formula $MgAl_2O_4$, Al-oxinitrides of generic formula $Al_{23-1/3x}O_{27+x}N_{5-x}$.

9. The method according to claim 8, wherein one of said oxinitrides is $Al_{23}O_{27}N_5$.

10. The method according to claim 1, wherein k has a value of −50 to +50.

11. The method according to claim 1, wherein k has a value of −10 to +10.

12. The method according to claim 1, wherein k has a value of −2 to +2.

13. The method according to claim 1, wherein c is $<1*10^{-2}$ $mm^{-1}$.

14. The method according to claim 1, wherein c is $<1*10^{-3}$ $mm^{-1}$.

15. The method according to claim 1, wherein c is $<4*10^{-6}$ $mm^{-1}$.

16. The method according to claim 1, wherein c is $<1*10^{-6}$ $mm^{-1}$.

17. The method according to claim 1, wherein a1, a2, a3, a4 are each $<10^{-2}$.

18. The method according to claim 1, wherein a1, a2, a3, a4 are each $<10^{-3}$.

19. The method according to claim 1, wherein b is less than 0.1 mm.

20. The method according to claim 1, wherein b is less than 0.05 mm.

* * * * *